(12) United States Patent
Okada

(10) Patent No.: US 6,410,882 B1
(45) Date of Patent: Jun. 25, 2002

(54) LASER WELDING METHOD

(75) Inventor: Takeshi Okada, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 7 days.

(21) Appl. No.: 09/616,054

(22) Filed: Jul. 13, 2000

(30) Foreign Application Priority Data

Jul. 19, 1999 (JP) ............................................ 11-204850

(51) Int. Cl.[7] ................................................ B23K 26/20
(52) U.S. Cl. .............................. 219/121.64; 219/121.74
(58) Field of Search ........................ 219/121.63, 121.64, 219/121.74, 121.78, 121.79, 121.8

(56) References Cited

U.S. PATENT DOCUMENTS 4,626,653 A  * 12/1986  Sciaky et al. .......... 219/121.63

FOREIGN PATENT DOCUMENTS

| JP | 58173095 | * | 10/1983 | ............ 219/121.63 |
|---|---|---|---|---|
| JP | 61199591 A | * | 9/1986 | ............ 219/121.63 |
| JP | 8-192286 | | 7/1996 | |
| JP | 9-293915 | | 11/1997 | |

OTHER PUBLICATIONS

"Present Status and Themes ofLaser Beam Weaver" by Shigeki Fujinaga., et al., pp43, "Monograph Collection of 26th Society for Study of Laser Heat Processing 1991".
Takacs et al., Advanced Laser Beam Cutting Using Adaptive Optics, ECLA '96, pp 971.
Pp183, SET Technical 1View No. 152, "Development of CO2 Laser Adapting Mirror" by Ken Okada et al.

* cited by examiner

Primary Examiner—Samuel M. Heinrich
(74) Attorney, Agent, or Firm—McDermott, Will & Emery

(57) ABSTRACT

A laser welding method is provided, by which the suppression of porosity is obtained even when a laser beam is not spun. Laser beam 1 is irradiated onto object W to be welded, to weld it while the focus position of the beam is vibrated in the optical axis direction. The beam focus position can be vibrated in the optical axis direction by using curvature variable mirror 7 in which the curvature of the reflecting surface can be controlled. The curvature variable mirror 7 having a structure in which a reflecting plate is transformed by a piezoactuator, and which can be driven at a high speed, is preferable as it allows the increase of the frequency of the vibration in the optical axis direction.

5 Claims, 5 Drawing Sheets

(2 of 5 Drawing Sheet(s) Filed in Color)

LASER WELDING METHOD

BACKGROUND OF THE INVENTION

1. Field of the Invention

The present invention relates to a laser welding method which increases the suppression of defective welding.

2. Description of the Related Art

Laser welding is suitable for precise and fine processing characterized by deep fusion and less thermal distortion.

Beam irradiation onto an object to be welded in the laser welding is carried out by the following methods.

(i) A beam fixing method in which the irradiation point of a laser beam is fixed to one point and an object to be welded is moved in order to be welded.

(ii) A spinning method in which a beam is spun while being fed.

(iii) A scanning method in which a beam is moved in zigzags.

It is important in laser welding to reduce defective welding such as porosity (pores) in the welded portion. If the welded portion has porosity, the strength of the welded joint weakens, and reliability of welding connection is lowered.

However, in the beam fixing method mentioned above (i), the welded portion easily contains, porosity. Depending on the material of the object to be welded, assisting gas is involved, and high porosity occurs, and therefore, a satisfactorily welded joint cannot be obtained. Also, this method (i) has the drawback in that the gap width, which can be welded in butt-welding, is narrow, or the joint strength obtained by lap welding is weak.

Therefore, as a countermeasure for the method (i), the abovementioned spinning method of (ii) and scanning method (iii) are considered.

In the spinning method, the beam is moved a certain number of times across the portion welded once of an object to be welded, and the resultant stirring effect in a fusing pool of the heat-fused object promotes discharge of the gas products. This method is effective to suppress porosity, if the spinning diameter and spinning frequency of the beam and feed speed of the object to be welded are selected properly. However, since the beam track between the left and right of the welded line is different, the welded condition may differ between the left and right of the butted point, and therefore, use of the method is restricted because of difficulty in setting the proper conditions. Also, even if this method can be used, the effect of suppressing porosity is limited, and a higher result cannot be expected.

On the other hand, in the scanning method, although the welded condition can be made uniform, the effect of suppressing porosity cannot be obtained.

Also, a method has been developed in which reflecting mirrors provided in the path of the laser beam are vibrated by a galvanometer to vibrate the focus position of the laser beam within a plane perpendicular to the optical axis ("Present Status and Themes of Laser Beam Weaver" by Shigeki Fujinaga, et al, pp43, "Monograph Collection of 26th Society for Study of Laser Heat Processing 1991"). This method is developed for the purpose of improvement of the welding strength by expanding the fusing width, whereby the spinning method and scanning method can be selected, however, the effect of increased suppression of porosity over the spinning method is not achieved.

Therefore, the object of the invention is to provide a laser welding method whereby an effect of suppressing porosity can be obtained regardless of the feed speed of the object to be welded and the beam track, and the advantages in both the spinning method and scanning method can be obtained by combining them.

SUMMARY OF THE INVENTION

In order to achieve the above theme, in the invention, a laser beam as a heat source is irradiated onto an object to be welded while the focus position of the beam is vibrated in the optical axis direction (the direction parallel to the optical axis, that is, the direction of the depth of the welded portion) to carry out welding.

Also, a method is employed as necessary in which the laser beam is irradiated onto the object to be welded while the focus position of the beam is vibrated in two directions, that is, the optical axis direction and a direction perpendicular to the optical axis.

When the focus position of the laser beam is vibrated in the optical axis direction, the fusing pool formed by heat-fusion of the object to be welded is efficiently stirred by the laser beam. As a result gas containing in a keyhole at the center of the fusing pool, which is a cause of porosity, evaporates easily to the open air, whereby porosity is suppressed.

This method is not restricted in use since the fusing pool can be stirred without spinning the beam, and can bring an effect of suppressing porosity in all laser welding.

Also, this method can be combined with the spinning method to increase the effect of suppressing porosity, or combined with the scanning method to suppress porosity while making the welding condition uniform.

BRIEF DESCRIPTION OF THE INVENTION

The file of this patent contains at least one drawing executed in color. Copies of this patent or patent application publication with color drawing(s) will be provided by the Patent and Trademark Office upon request and payment of the necessary fee.

The foregoing and other features and advantages of the present invention will become more readily appreciated as the same is better understood by reference to the following detailed description when taken in conjunction with the accompanying drawings wherein.

DETAILED DESCRIPTION OF THE PREFERRED EMBODIMENTS

Figure 1:
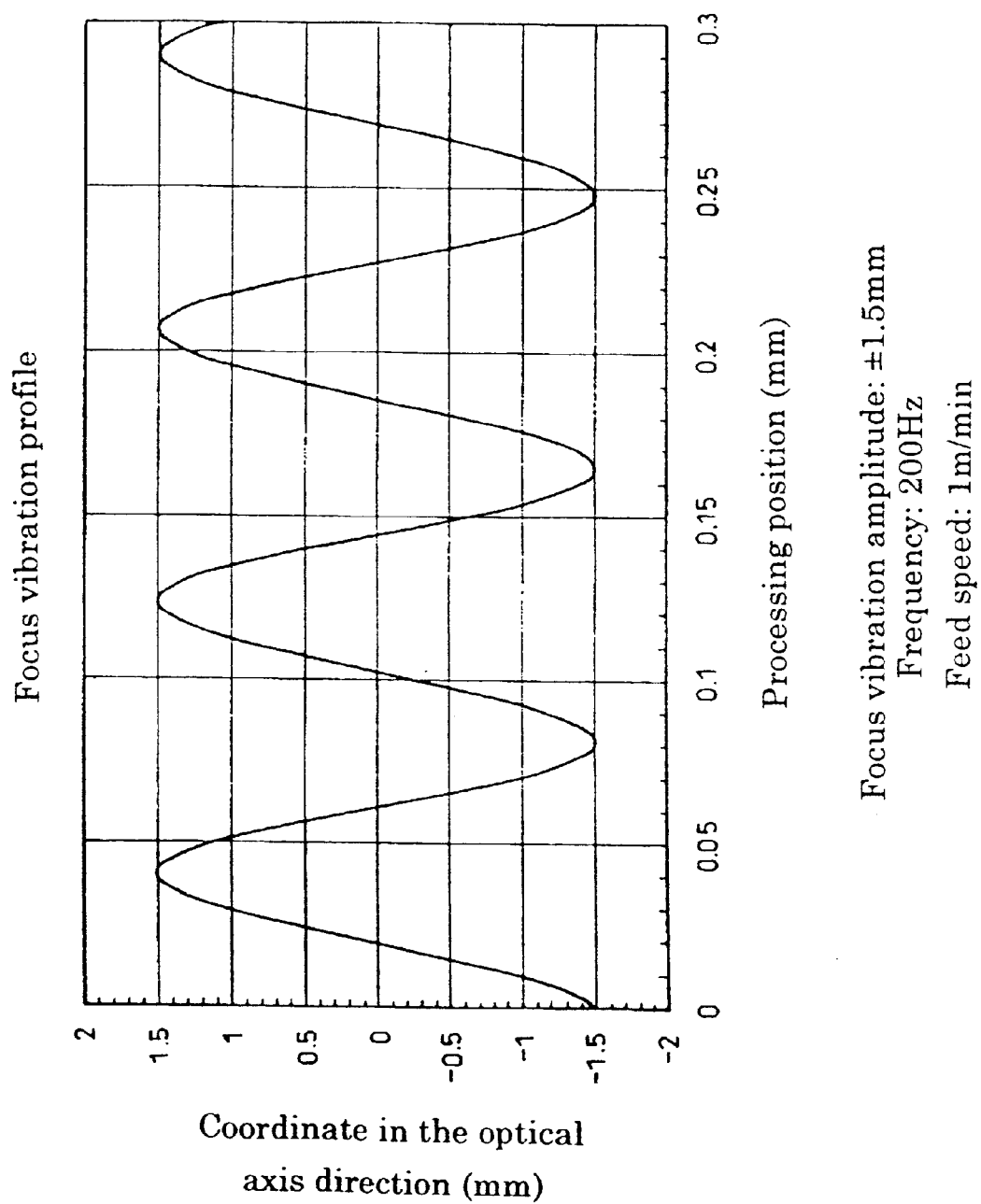
FIG. 1 is a diagram showing an example of the profile of focus vibration.

FIG. 1 shows an example of a focus vibration profile when the method of the invention is conducted. This is a vibration waveform when the focus of the beam is vibrated in the optical axis direction under the conditions of an amplitude of ±1.5 mm, a frequency of 200 Hz, and a feed speed of 1 m/min.

Figure 2:
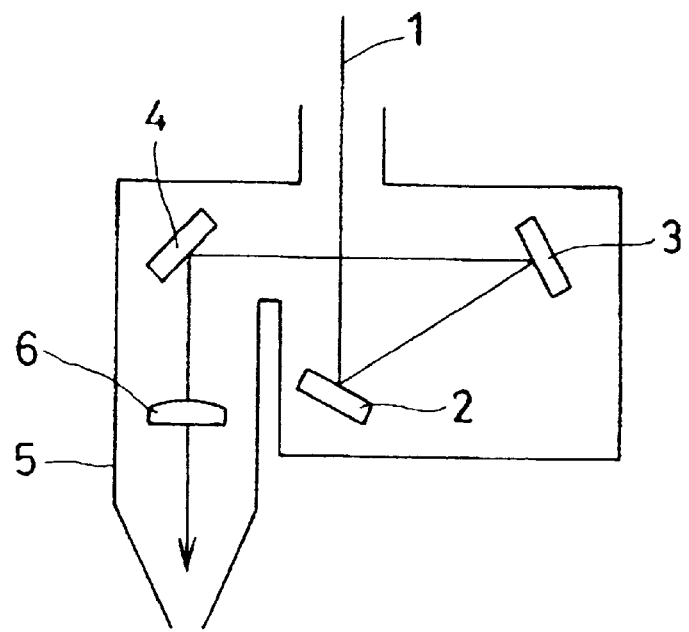
FIG. 2 is a drawing showing an example of the optical system in the processing head of the laser processor.

The beam focus position can be vibrated in the optical axis direction by a method in which at least one of the reflecting mirrors provided in the optical path of a laser processor is comprised of a curvature variable mirror in which the curvature of the reflecting surface can be controlled, and the radius of curvature of the reflecting surface of the curvature variable mirror can be changed. FIG. 2 shows optical components inside the processing head of the laser processor. Thus, laser beam 1 passes a plurality of reflecting mirrors 2, 3, and 4 disposed in the optical path, and then, is converged onto light converging lens 6 inside torch 5, and caused to strike the object to be welded.

Figure 3:
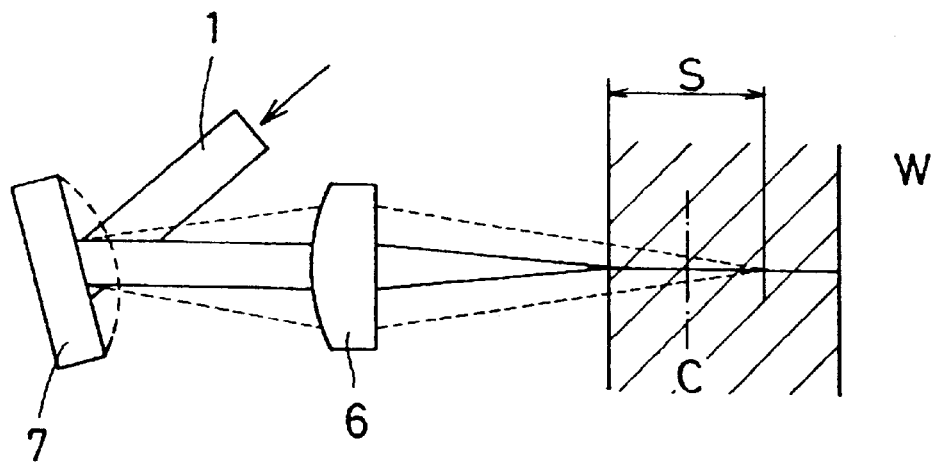
FIG. 3 is a drawing showing the principle of focus vibration by means of the curvature variable mirror.

FIG. 3 is a drawing in which the reflecting mirror 4 at the last stage is replaced by curvature variable mirror 7. If the radius of curvature of the reflecting surface of this curvature variable mirror 7 is changed, the radiation angle of the beam to be made incident onto the light converging lens 6 changes, whereby the focus position of the beam moves in the optical axis direction. Therefore, by repeated changing of the radius of curvature of the reflecting surface, the beam focus position can be vibrated in the optical axis direction.

Figure 4:
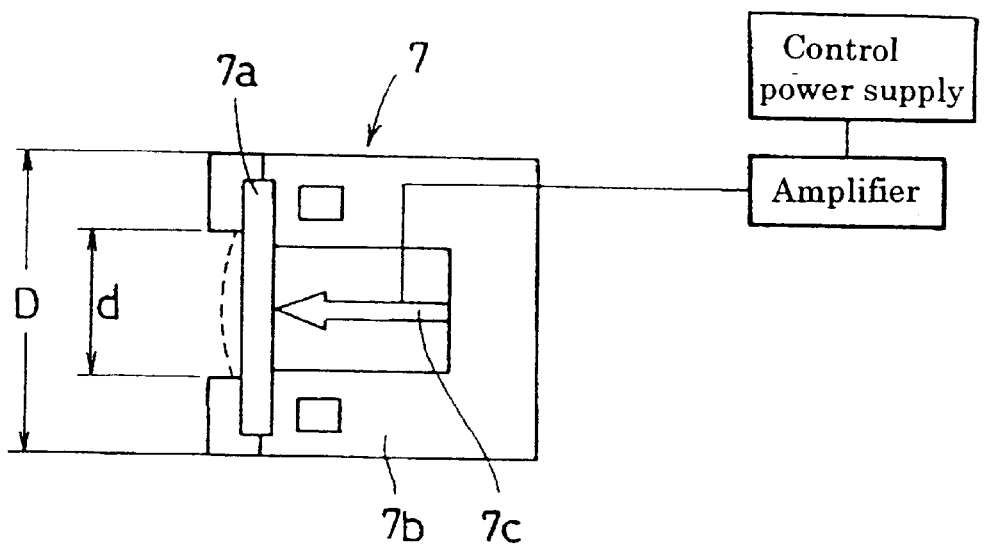
FIG. 4 is a schematic structural view of the curvature variable mirror using a piezoactuator.

It is preferable as a curvature variable mirror to use the mirror proposed in Japanese Laid-Open Patent Publication No. 293915 of 1997. FIG. 4 is a schematic view of this curvature variable mirror. In this mirror, reflecting plate (mirror) 7a is supported by water-cooled mirror mount 7b, and is transformed by pressurization by piezoactuator 7c provided behind it. The piezoactuator 7c is a pressurizing element formed by housing a lamination of piezoelectric ceramic in a stainless steel case. There is a transforming mirror using a hydraulic pressure other than this piezoactuator 7c, and if a curvature variable mirror equipped with a piezoactuator as a drive source which can be driven at a high speed is employed, the vibration frequency for focus vibration can be increased to improve the suppression of porosity.

Also, if there are curvature variable mirrors of other systems, they can, of course, be used.

Next, the vibration of the beam focus in the optical axis and perpendicular directions may be rotating vibration or linear vibration. When rotating vibration is applied while feeding the object to be welded, spinning can be carried out, and when linear vibration is applied while feeding the object to be welded, scanning can be carried out.

Figure 5:
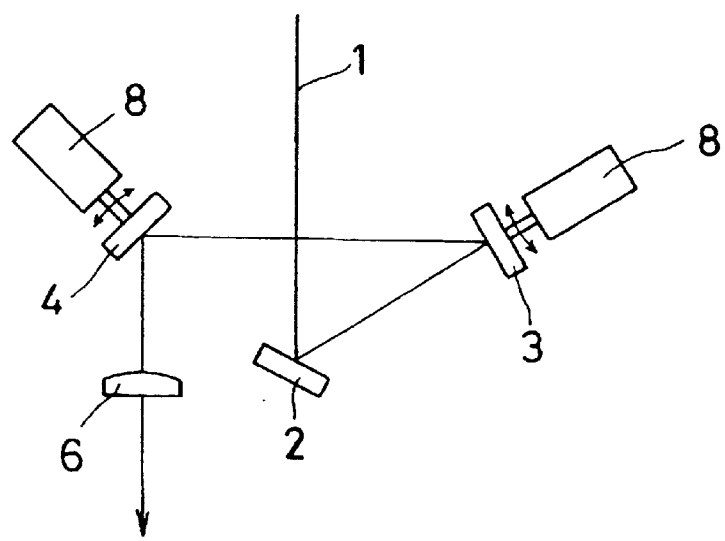
FIG. 5 is a drawing showing the optical system having a structure for vibrating the reflecting mirror by a galvanometer.

Spinning and scanning are preferably performed by the method shown in the previously mentioned monograph or Japanese Laid-Open Utility Model Publication No. 8-192286, as shown in FIG. 5, that is, a method in which the two reflecting mirrors 3 and 4 are vibrated (swung) at a minute angle by galvanometer 8 on the basis of the axes orthogonal to the mirrors as fulcrums. By employing this method, spinning and scanning can be selected for use.

If one or both of the reflecting mirrors 3 and 4 or the reflecting mirror 2 of FIG. 5 are comprised of the curvature variable mirror as mentioned above, the spinning method and scanning method can be carried out while vibrating the beam focus in the optical axis direction.

Also, it was reported (Takacs et al., Advanced Laser Beam Cutting Using Adaptive Optics, ECLA '96, pp971), that the roughness of the cutting surface in the field of laser cutting was smoothened by the beam control for vibrating the focus position of the laser beam in the optical axis direction however, in this report that this control is not found to be effective for suppressing porosity in laser welding.

Hereinafter, a further detailed example of the method of the invention shall be described. A curvature variable mirror having the structure of FIG. 4 using a piezoactuator was manufactured following the reference document (pp183, SEI Technical View No. 152, "Development of $CO_2$ Laser Adapting Mirror" by Ken Okada et al). The specifications of this curvature variable mirror, in FIG. 4, are the mirror mount diameter D=100 mm, reflecting surface opening d=62 mm, stroke of the piezoactuator 7c=30 □m, positioning precision: ±1 □m, the reflecting surface form of the reflecting plate 7a in being non-controlled: plane, range of curvature of the reflecting surface: ∞⇌20 m convex, and effective diameter: 50 mm. In order to obtain a high-precision spherical surface, thickness distribution in which the center side was increased in thickness was provided at the back surface of the reflecting plate 5a. Also, gold was vapor-deposited on the reflecting surface in order to reduce reflection loss.

Curvature variable mirror 7 having the abovementioned specifications was disposed at the front side of the light converging lens 6 and assembled to the processing head of the $CO_2$ laser processor as shown in FIG. 3. A $CO_2$ laser oscillator was used herein as the laser processor, however, a YAG laser or the like may also be used. Also, in place of the light converging lens 6, a parabolic reflector or other optical parts can be used to converge light.

Beam conditions were CW, output of 1 kw, and gauss mode, and a setting was made so that a general beam of $\phi$30 mm ($1/e^2$ diameter) was made incident onto the curvature variable mirror at an incidence angle of 15°.

The focal length of the light converging lens was 7.5 cm (190.5 mm). The frequency of focus vibration was 200 Hz, amplitude of the focus position vibration was ±1.5 mm (amplitude S of FIG. 3=3 mm). For the vibration waveform, a sine wave shown in FIG. 1 was used.

SUS 304 and a magnesium alloy (MP1) were used as the object to be welded, however, the materials of the object to be welded are not limited to these.

The amplitude center C of the focus vibration was set to the position of a depth of 1.5 mm from the surface of the object W to be welded. The feed speed when welding was set to 1 m/min, and an argon gas was used as a shield gas.

Figure 6A:
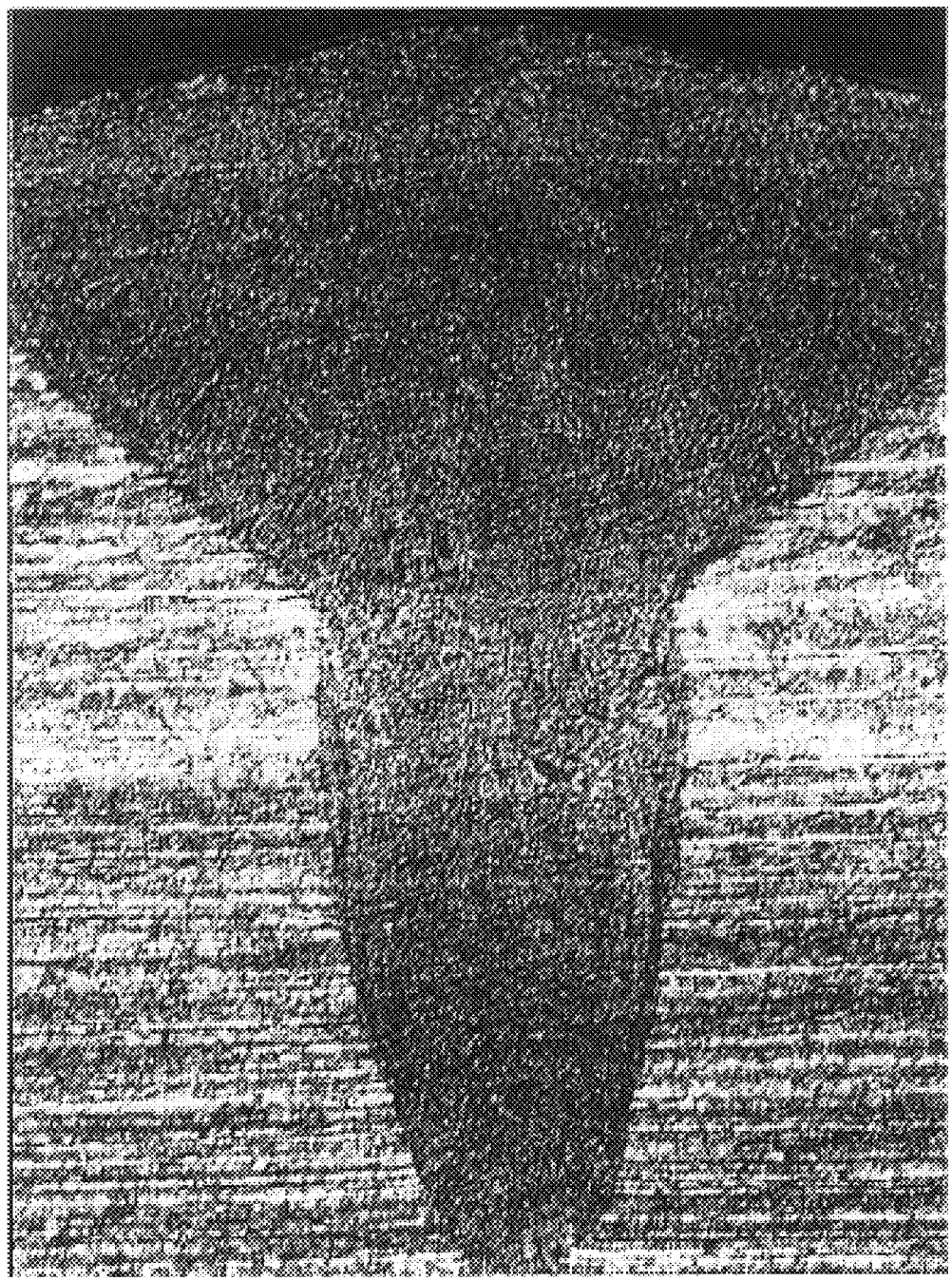
FIG. 6a is a photo showing the section of the welded bead in a case where focus vibration is applied.
Figure 6B:
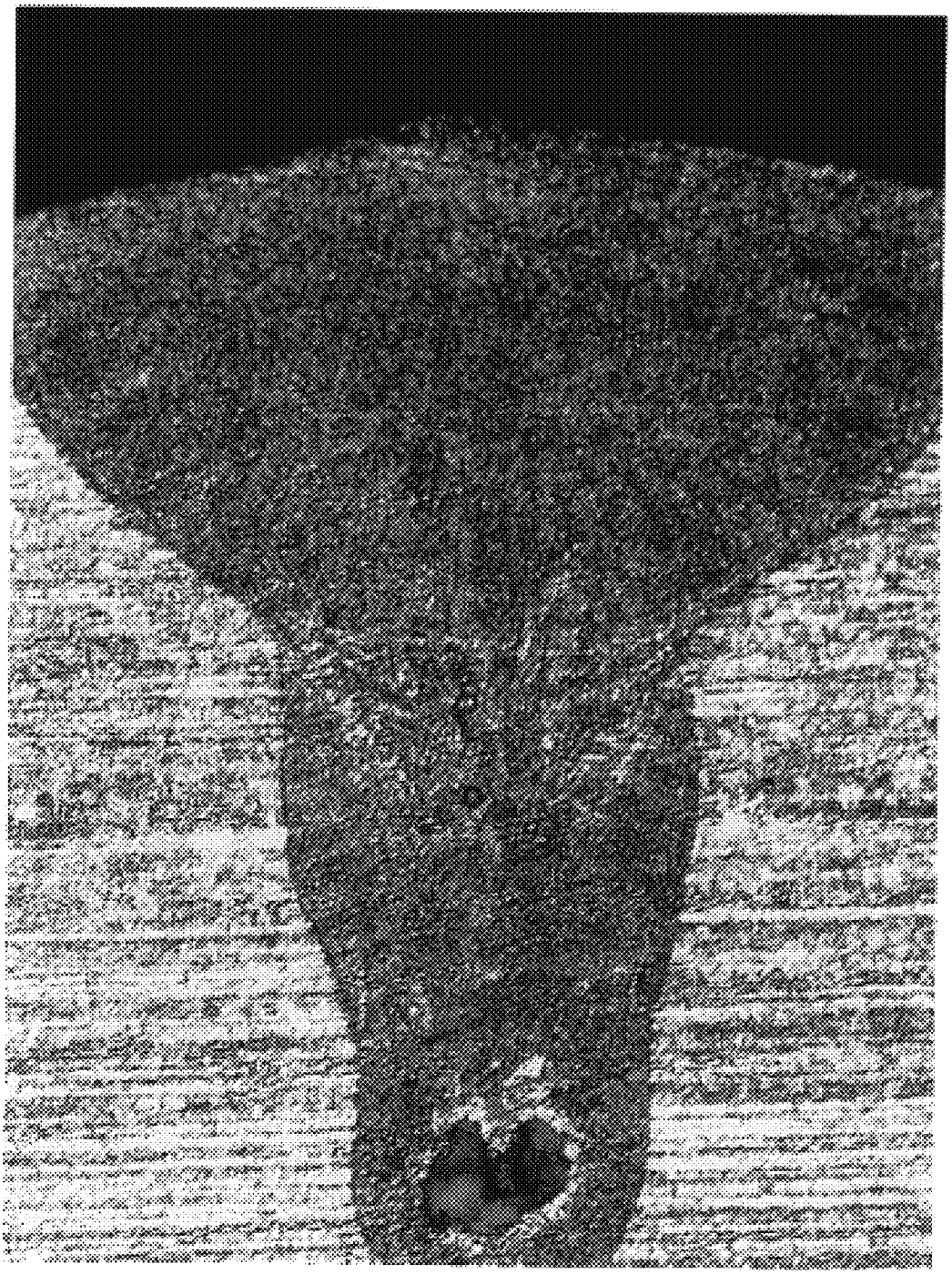
FIG. 6b is a photo showing the section of the welded bead in a case where focus vibration is not applied.

After welding under the abovementioned conditions, the number of pores in the welded bead was investigated. The results are shown in Table 1. The porosity evaluation was made by means of an X-ray penetration test (60 kV×5 mA). FIG. 6 is photos showing the bead sections in cases where focus vibration is applied and not applied.

TABLE 1

Results of measurements of the
number of defects in the welded bead
(bead-on plate)

| Object to be welded | | |
|---|---|---|
| | Number of Pores/50 mm Bead Length | |
| Magnesium Alloy | With focus vibration: 4 points | Without focus vibration: 12 points |
| SUS 304 | With focus vibration: 10 points | Without focus vibration: 14 points |

Note: Defects of $\phi$0.2 mm or more were counted.

It can be clearly understood from Table 1 that porosity is suppressed when the focus is vibrated in the optical axis direction.

It was also confirmed by the experiment that, if the scanning or spinning for vibration of the beam focus position in a direction perpendicular to the optical axis and vibration in the optical axis direction were combined, it became possible to weld with at large fusing width and less porosity.

As described above, in the invention, since welding is carried out while the focus of the laser beam is vibrated in the optical axis direction, it is possible to suppress porosity evert without spinning the beam, and this is useful to reduce defective welding.

Also, the suppression of porosity can be increased with the increase of the fusing width by combining the method of the invention with the spinning method, or porosity can be suppressed with the increase of the fusing width and the welding condition is made uniform by combining the method with the scanning method, whereby reliability of the welded joint can be improved.

What is claimed is:

1. A laser welding method, wherein a laser beam is used as a heat source, and the laser beam is irradiated onto an object to be welded while the focus position of the beam is vibrated in the optical axis direction to carry out welding , and wherein, among reflecting mirrors provided in the optical path of a laser processor, at least one reflecting mirror is comprised of a curvature variable mirror in which the radius of curvature of the reflecting surface can be controlled, and by changing the radius of curvature of the reflecting surface of the reflecting mirror, the focus position of the beam is vibrated in the optical axis direction.

2. A laser welding method as set forth in claim 1, wherein, a curvature variable mirror of a system in which a piezoacturator provided behind the reflecting plate is expanded and contracted to transform the reflecting plate is used to vibrate the focus position of the beam in a direction parallel to the optical axis at a vibrating frequency of 20 Hz or more.

3. A laser welding method, wherein a laser beam is used as a heat source, and the laser beam is irradiated onto an object to be welded while the focus position of the beam is vibrated in two directions, that is, the optical axis direction and a direction perpendicular to the optical axis.

4. A laser welding method as set forth in claim 3, wherein, among reflecting mirrors provided in the optical path of a laser processor, at least one reflecting mirror is comprised of a curvature variable mirror in which the radius of curvature of the reflecting surface can be controlled, and by changing the radius of curvature of the reflecting surface of the reflecting mirror, the focus position of the beam is vibrated in the optical axis direction.

5. A laser welding method as set forth in claim 4, wherein, a curvature variable mirror of a system in which a piezoacturator provided behind the reflecting plate is expanded and contracted to transform the reflecting plate is used to vibrate the focus position of the beam in a direction parallel to the optical axis at a vibrating frequency of 20 Hz or more.

* * * * *